Sept. 9, 1930.  L. GAHN  1,775,277
CANDY MAKING MACHINERY
Filed Aug. 16, 1926
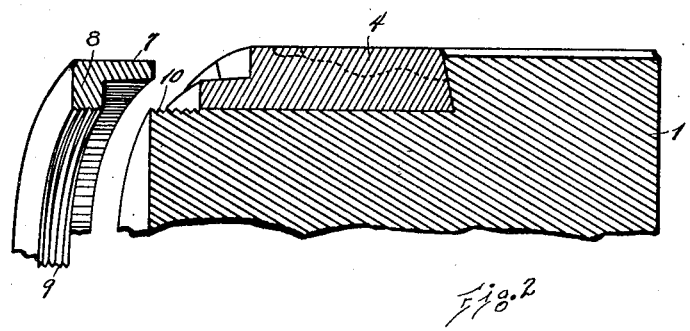
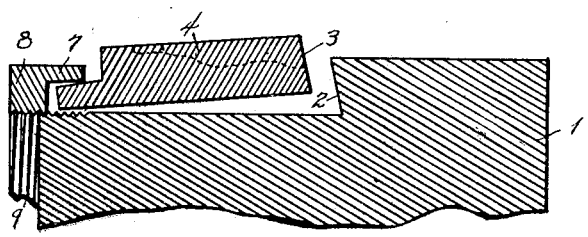
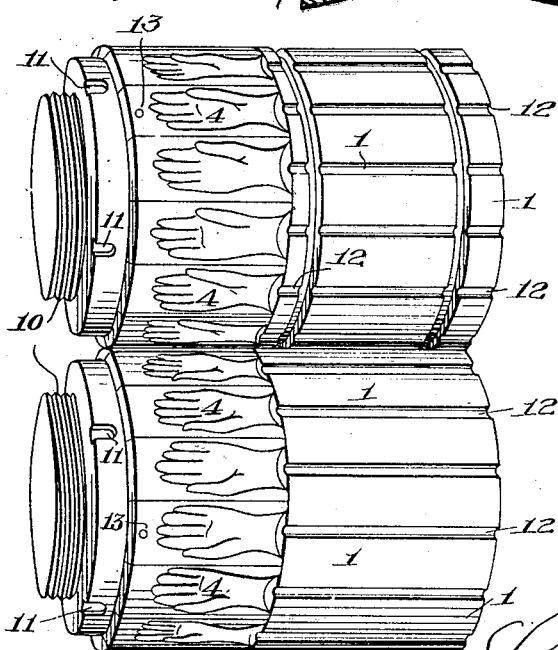
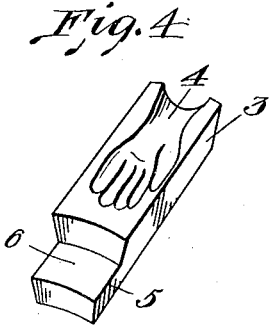
INVENTOR
Lawrence Gahn Patented Sept. 9, 1930

1,775,277

UNITED STATES PATENT OFFICE

LAWRENCE GAHN, OF ST. LOUIS, MISSOURI, ASSIGNOR OF FIFTY PER CENT TO JOHN V. LEE, OF ST. LOUIS, MISSOURI

CANDY-MAKING MACHINERY

Application filed August 16, 1926. Serial No. 129,471.

My invention relates to improvements in candy making machinery and particularly to that type of apparatus intended for the molding of lolly-pops, suckers, and similar confections which are cast into forms and configurations attractive to the eye and adapted to be handled and conveyed to the mouth by a stick.

It is an object of my invention to improve the apparatus used for manufacturing such candies to the end that the products obtained will be symmetrical in contour and shape and pleasing to the eye.

It is another object of my invention to improve the construction of the machine used for the manufacture of such candies by providing means whereby the parts subjected to most wear may be easily and cheaply replaced with a minimum of effort and loss of time and further to provide means permitting the use of relatively cheap and replaceable wearing members in lieu of costly artisan-executed integral parts.

A still further object resides in providing a novel combination of process steps whereby an improved candy product will be obtained in a more advantageous manner than with machines of existing types.

Further objects and advantages will appear from the annexed specification and will be pointed out with particularity in the appended claims.

In the manufacture of confectionery of the lolly-pop or sucker type it is customary to cast the molten candy into suitable molds and to insert wooden sticks therein manually. After the candy has set the molds are pried open and the products removed. This process is slow and costly, the output being limited by the number of molds available, and the number remaining idle while waiting for the candy to set.

This process has been largely superseded by the continuous or roller process whereby a slab of plastic candy matrix of suitable consistency is passed between two metal rollers, the surface of one of which bears indented impressions of the images into which the candy is to be formed, while the surface of the other roller which aids in the rolling process is comparatively smooth. The latter process, although possessing the advantage of being continuous and suitable for line production, is open to serious objections. The image-forming roller is a solid rotating die comprising a solid metal cylinder into whose surface a plurality of depressed images have been sunk by expensive manual die-sinking processes, such as chipping, grinding, engraving, and the like. When, due to the premature setting of the matrix, the accidental inclusion of foreign matter, natural wear, or other causes the surfaces of some of the dies and particularly the walls separating them from adjacent dies become dented, chipped, or worn it is necessary to replace the entire roller even though some of the dies may still be in serviceable condition. This entails an enormous expense due to the waste of poorly formed unmerchantable products, as well as the complete shut-down engendered by the taking apart of the machine. Furthermore, with none of the solid die-rollers hitherto used has it been possible to produce candy objects of absolutely perfect and symmetrical shape and contour such as spheres, hands, animals, life-like comic figures, and the like, due to the impossibility of engraving the dies on each of the large rollers exactly alike and in perfect register. Hence, the products obtained always had one flat surface or else the hollow spaces on an object were joined by a web of candy which destroyed the attractive appearance essential to successful sale of this type of confection. In addition, the wearing of the dies, and particularly of the walls between adjacent dies, causes the formation of irregular bridges between the individual candy objects and when these are broken to separate the objects jagged edges are left which are unsightly and a source of danger to the consumer.

These disadvantages are obviated by the improved roller construction of my invention and the process employed by me, as hereinafter described.

In the drawings, Fig. 1 shows a view of my improved roller construction showing the dies and the means used for holding them in place. Figs. 2 and 3 represent sections through parts of my improved rollers. Fig. 4 is a view of one of the dies.

Referring to the drawings in which the same reference characters are used to designate the same elements wherever they may appear in each of the several views, it will be observed that the improved roller of my invention comprises a body member, 1, which may be of steel or other suitable metal. This body member has a reduced portion adapted to accommodate a plurality of dies and terminated by a tapering wall 2 to receive the correspondingly shaped side 3 of the interchangeable die. The hollowed-out image forming portion of the die is indicated at 4. The end of the die opposite the tapered side 3 is provided with a projection or off-set portion 5, the top surface 6 of which is rounded off so as to permit the flange 7 of the collar 8 to be slipped thereover. Collar 8 is preferably secured in place by screwing it upon the end of the roller 1, suitable threads 9 and 10 being provided on the respective members, although it will be appreciated that any other method of fastening may be adopted. Suitable recesses or equivalent means 11 may be provided in the collar 8 at various places to permit the application of spanners for tightening or loosening the same.

In positioning the dies on the rollers the dies are assembled upon the surface with their tapered edge 3 abutting against the corresponding wall 2 of the roller. After the dies are in place the collar 8 is slipped over the surface 6 of the prolongation 5 and positioned, thus locking the dies together and in place upon the surface of the roller. If desired, a rivet or screw may be passed through one of the dies and into the body of the roller, as shown at 13, in order to prevent rotational displacement or slipping of the dies as a body during heavy use. Any other suitable means such as dowels disposed upon the tapered edge 3 of the die coacting with recesses (not shown) in the tapered wall 2 of the roller may be used to prevent the dies slipping out of register during operation.

It will be observed that the invention is illustrated by showing an executional example thereof applied to the manufacture of candy hands representing a type of object requiring a reverse and an obverse die and indicating the difficulties encountered in attempting to manufacture two rollers of this type by the prior art method of die-sinking or engraving as distinguished by my improved method of using interchangeable, replaceable dies. The dies themselves may be cast in a mold from inexpensive metal such as bell metal or brass, and require no machining prior to being inserted into position on the surface of the roller. Any desired number of dies may be disposed on the surface of the roller according to its size, and the size of the candy products desired may be varied in accordance with the market conditions by simple substitution of appropriate dies. It is to be observed that the dies on one roller are to form the reverse of an image while those on the coacting roller are to constitute the obverse of the same image so that when the plastic candy mass is passed between the two rollers the obverse and reverse die will come together and squeeze the plastic mass entrapped between them into the desired shape. By shaping the obverse and reverse dies exactly alike it is possible to secure objects of perfectly symmetrical contour, such as spheres and the like. Likewise, by making the reverse die simulate one half of a figure and the obverse die the other half, a complete candy image, devoid of unsightly flat edges, may be secured.

In use, as the rollers rotate and the candy mass is fed to them, a hopper containing wooden sticks (not shown) and disposed in operative relation to one of the rollers feeds a wooden stick for the grooves 12. At a suitable instant, preferably when the two dies halves are pressed together to contain a batch of candy; a pusher-rod or other device (not shown) forces the stick into the plastic mass. The details of this rod insertion process, however, are well known in the art and constitute no part of my invention but are recited to illustrate the operative relation of my improved rollers to a complete machine.

In the process of making candy with the aid of my improved rollers the plastic candy mass is fed to the rollers at one end of the machine and after being shaped by the dies and having its stick inserted the candy figures emerge from the other side of the machine as a string of candy objects held together by an almost negligible and uniform web just sufficient to permit handling and quite different in character from the thick objectionable bridge formed in the case of worn or damaged dies on the prior art rollers. Since it usually takes an appreciable length of time for the candy to set to a permanent non-deformable hardness it is inadvisable to lay the candy down upon flat objects immediately.

When a die becomes worn or damaged or a given design becomes obsolete it is but the matter of a few minutes to place a new die in operating position on the rollers, or to insert the set of dies necessary for producing a new design. Furthermore, as the popularity of one image decreases it is possible to decrease the manufacture thereof gradually and to effect this reduction coincident with a more extensive production of the more popular patterns with a single set of rollers, the same roller being used for the production of several images, with the result that a greater quantity of one image than that of another will be obtained. Thus, by way of example, it is possible to arrange the dies so that the rollers may have a capacity of twenty-eight cooperating dies capable of producing fourteen candy objects of which twelve may be of a very popular configuration and two of a shape whose popularity is decreasing, this arrangement permitting the manufacturer to produce candy to meet all needs.

From the foregoing specification taken in consideration with the annexed drawings, the advantages of the construction and method of operation will be readily understood by those skilled in the art to which the invention appertains, and while I have described the construction which I now consider to be the best embodiment thereof, it is to be understood that the apparatus depicted is merely illustrative and that such changes may be made when desired as fall within the scope of the appended claims.

I claim:

1. A roller for a candy forming machine comprising a cylindrical, shouldered body portion, a die detachably disposed upon the surface of said body portion, holding means for one end of the die, formed integrally with the die and body portion, and an annular element in threaded engagement with the shoulder on said body portion, adapted for securing the opposite end of said die to said body.

2. In a candy forming machine, the combination of a pair of rollers, removable dies on the surface of each of said rollers, positioning means for one end of each die, formed integrally with the dies and rollers, and a flanged collar threadedly secured to the roller in engagement with the dies for securing the opposite ends of said dies in place on said rollers.

3. In a candy forming machine, the combination of a pair of rollers, image forming means detachably carried on the surface of each of said rollers adapted to form a candy object of symmetrical contour, means constituted by the rollers and image forming means, for positioning the image forming means, and a threaded annular retention member engaging each of said rollers and the image forming means carried thereby.

4. As an article of manufacture, a die adapted to be removably attached to a roller of a candy forming machine, said die having a shoulder on one end, and a dissimilar, tapered portion on the opposite end, by which the die is adapted to be retained on the roller.

5. A roller for a candy forming machine comprising a body member having a reduced portion, a tapered wall in said reduced portion, a plurality of image-forming dies in said reduced portion, said dies having a tapered wall adapted to co-act with the tapered wall of said reduced portion for the purpose of retaining said dies in place in said portion and means associated with said roller and another portion of said dies opposite the tapered walls thereof and adapted to retain said dies in place upon the roller.

6. In a roller for a candy forming machine, the combination of a cylindrical body member having a portion of reduced diameter, a plurality of removable dies disposed within said reduced portion, a tapered wall in said reduced portion adapted to co-act with correspondingly tapered walls on said dies, a collar threadedly engaging an end of said roller remote from said tapered wall and one end of said dies and adapted to lock said dies securely in said reduced portion.

7. A roller for a candy forming machine comprising a cylindrical member, a plurality of removable dies contiguously disposed upon said cylindrical member, means integral with one part of said cylindrical member for engaging one portion of said dies, and means threadedly engaging another portion of said cylindrical member and said dies and adapted to lock said dies in position upon said member.

8. A roller for a candy forming machine comprising a cylindrical member, having a reduced portion, a plurality of removable dies disposed in said portion, means, associated with one end of said dies and the wall of said reduced portion forming a wedge-joint to hold said dies in place at that point, and adjustable means associated with another end of said dies and said cylindrical member, and adapted to co-operate with said first mentioned means to lock said dies securely in place in said reduced portion.

9. In a roller for a candy forming machine, the combination of a cylindrical member having a portion of reduced diameter, a plurality of dies disposed in said reduced portion, the wall of said reduced portion being tapered and one end of said dies being correspondingly tapered to co-act therewith, said dies having a prolongation at one end, a collar adapted to fit over said prolongations, said collar being rotatably mounted upon an end of said roller and adapted when rotated to lock said dies into immovable relation in said reduced portion.

LAWRENCE GAHN.